(12) United States Patent
Frick

(10) Patent No.: US 9,776,659 B2
(45) Date of Patent: Oct. 3, 2017

(54) BOLTED TRAILER FRAME

(71) Applicant: LIPPERT COMPONENTS, INC., Elkhart, IN (US)

(72) Inventor: Jonathan Frick, Elkhart, IN (US)

(73) Assignee: LIPPERT COMPONENTS, INC., Elkhart, IN (US)

( * ) Notice: Subject to any disclaimer, the term of this patent is extended or adjusted under 35 U.S.C. 154(b) by 177 days.

(21) Appl. No.: 14/930,855

(22) Filed: Nov. 3, 2015

(65) Prior Publication Data
US 2016/0121948 A1    May 5, 2016

Related U.S. Application Data

(60) Provisional application No. 62/075,594, filed on Nov. 5, 2014.

(51) Int. Cl.
*B62D 21/12* (2006.01)
*B62D 21/02* (2006.01)
*B62D 21/20* (2006.01)

(52) U.S. Cl.
CPC ............ *B62D 21/02* (2013.01); *B62D 21/12* (2013.01); *B62D 21/20* (2013.01)

(58) Field of Classification Search
CPC . B60G 3/12; B60G 7/02; B60G 11/18; B60G 21/026; B60G 21/051; B60G 21/052; B60G 2200/22; B60G 2204/1434; B62D 21/20

USPC .......................................... 280/785, 789, 799
See application file for complete search history.

(56) References Cited

U.S. PATENT DOCUMENTS

| | | | | |
|---|---|---|---|---|
| 5,088,763 A | * | 2/1992 | Galazin | B60G 9/04 280/124.109 |
| 5,335,932 A | * | 8/1994 | Pierce | B60G 11/27 280/124.116 |
| 5,454,597 A | * | 10/1995 | Thomas | B62D 53/06 280/789 |
| 7,121,586 B2 | * | 10/2006 | McNally | B62D 21/02 228/165 |
| 2002/0063422 A1 | * | 5/2002 | Few | B60G 3/12 280/789 |
| 2006/0108784 A1 | * | 5/2006 | Van Der Bijl | B62D 21/02 280/800 |
| 2007/0290495 A1 | * | 12/2007 | Biscan | B62D 21/20 280/789 |
| 2008/0246263 A1 | * | 10/2008 | McPherson | B62D 27/065 280/798 |
| 2013/0300097 A1 | * | 11/2013 | Garceau | B62D 21/02 280/789 |

* cited by examiner

*Primary Examiner* — Toan To
(74) *Attorney, Agent, or Firm* — Barnes & Thornburg LLP

(57) ABSTRACT

A bolted trailer frame includes frame rails provided in plural sections. The plural sections are bolted together using butt joints reinforced by one or more reinforcement brackets or plates.

19 Claims, 3 Drawing Sheets

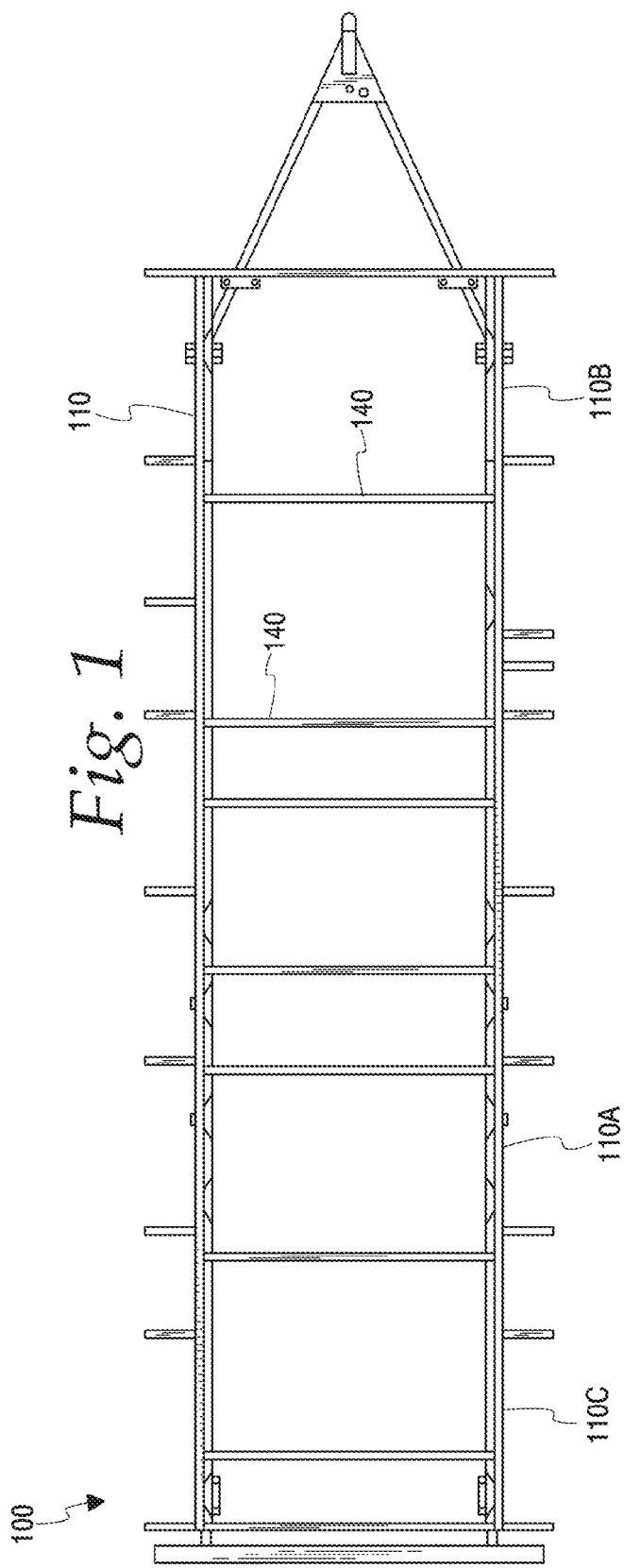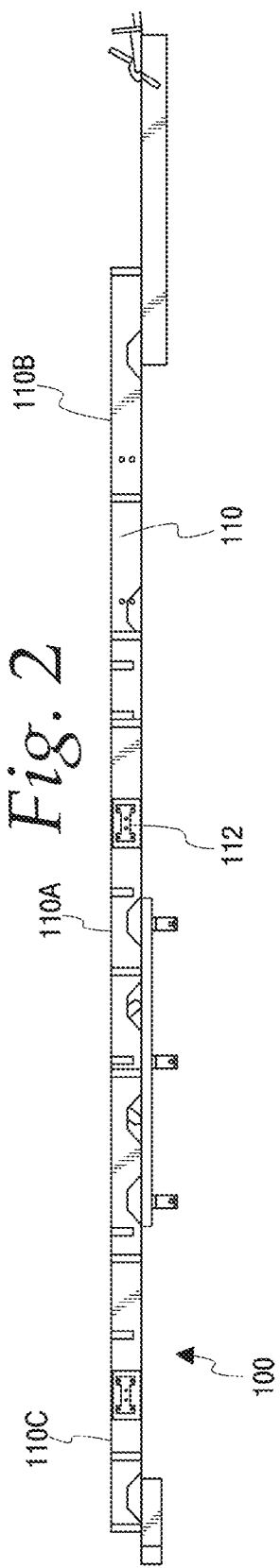

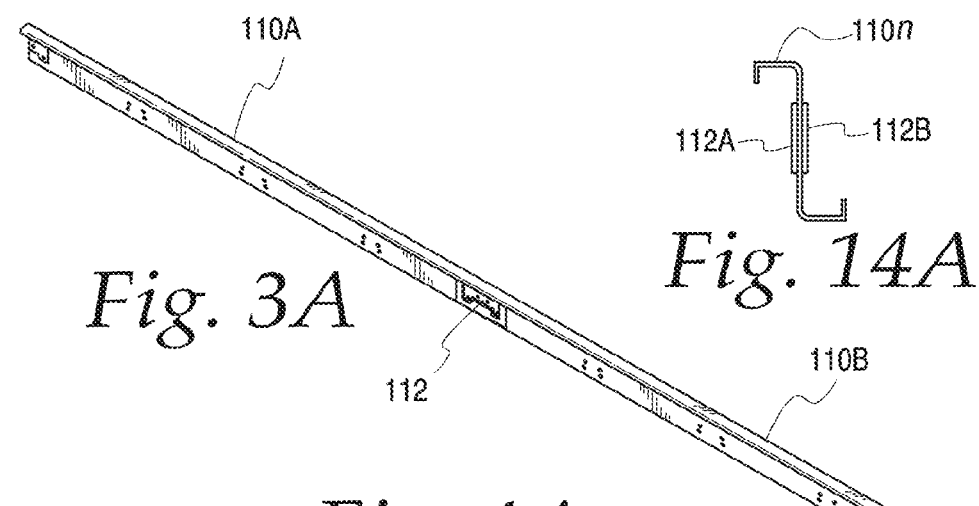
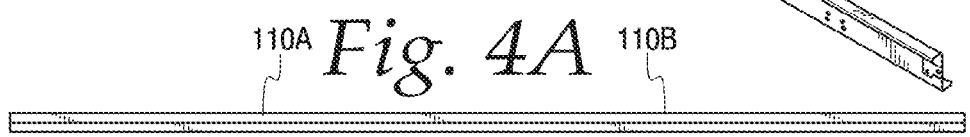
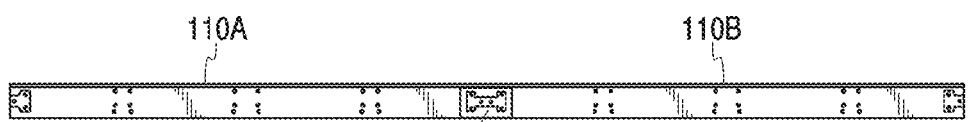
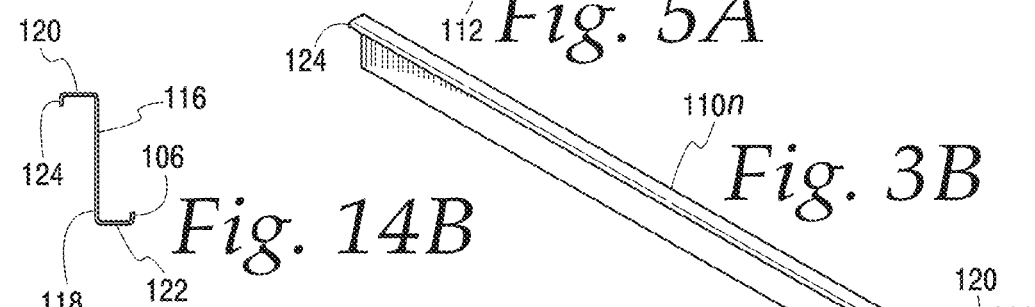
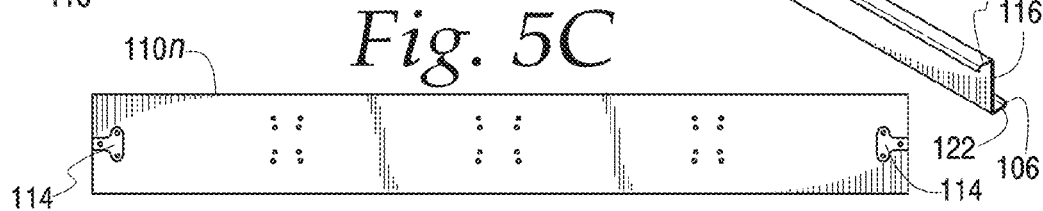
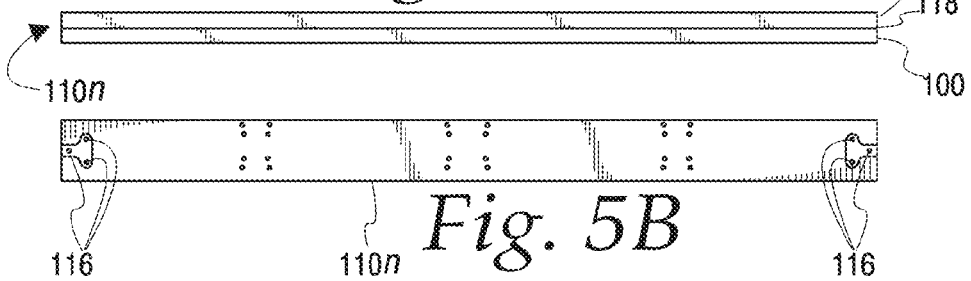

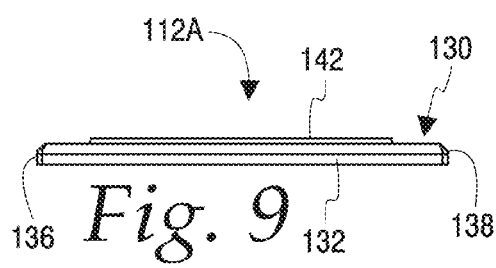
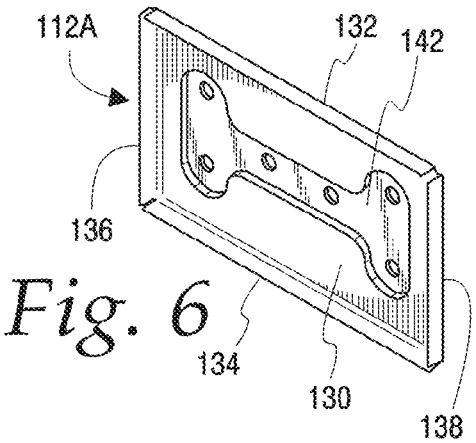
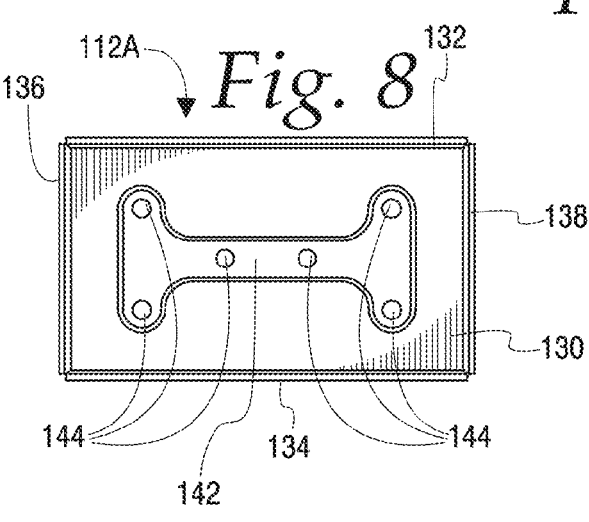
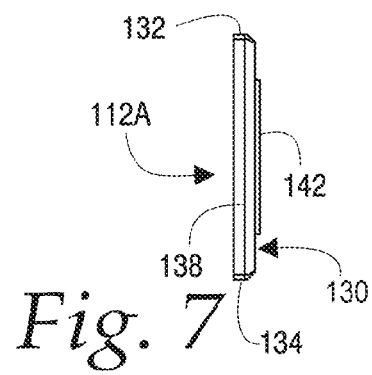
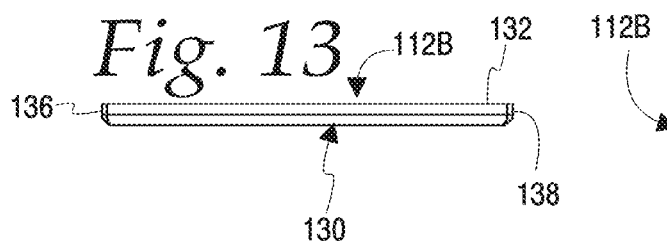
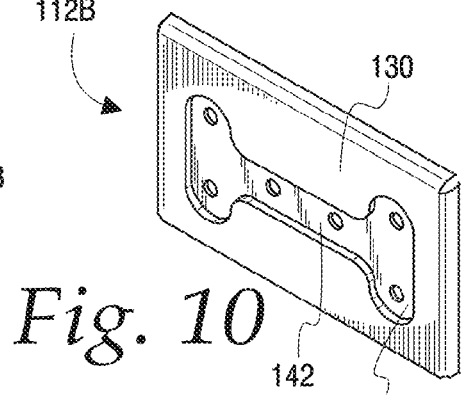
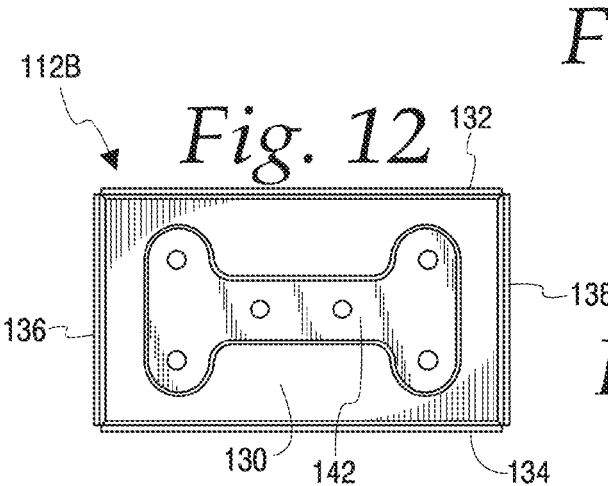
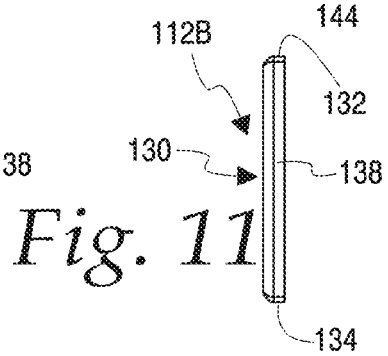

BOLTED TRAILER FRAME

CROSS-REFERENCE TO RELATED APPLICATIONS

This application claims benefit of U.S. Provisional Patent Application No. 62/075,594, filed on Nov. 5, 2014, and incorporates by reference the disclosure thereof in its entirety.

BACKGROUND OF THE DISCLOSURE

Trailer frames typically comprise plural longitudinally-extending frame rails and plural cross members connecting the frame rails together. Each frame rails may be provided in plural sections that are joined together by butt joints. Means may be provided to strengthen or reinforce the butt joints.

BRIEF DESCRIPTION OF THE DRAWINGS

FIG. 1 is top plan view of an illustrative trailer frame;
FIG. 2 is a side elevation view of an illustrative trailer frame;
FIG. 3A is a perspective view of an illustrative frame rail;
FIG. 3B is a perspective view of an illustrative frame rail section;
FIG. 4A is a top plan view of an illustrative frame rail;
FIG. 4B is a top plan view of an illustrative frame rail section;
FIG. 5A is a side elevation view of an illustrative frame rail;
FIGS. 5B-5C are side elevation views of an illustrative frame rail section;
FIG. 6 is a perspective view of a first reinforcing plate;
FIG. 7 is an end elevation view of a first reinforcing plate;
FIG. 8 is a front elevation view of a first reinforcing plate;
FIG. 9 is a top plan view of a first reinforcing plate;
FIG. 10 is a perspective view of a second reinforcing plate;
FIG. 11 is an end elevation view of a second reinforcing plate;
FIG. 12 is a front elevation view of a second reinforcing plate;
FIG. 13 is a top plan view of a second reinforcing plate; and
FIGS. 14A-14B are end views of an illustrative frame rail section

DETAILED DESCRIPTION OF THE DRAWINGS

A trailer frame 100 may include one or more longitudinally-extending frame rails 110. Each frame rail 110 may comprise plural sections 110A-110n. The plural sections 110A-110n may be bolted together end-to-end using butt joints. The butt joints may be reinforced with one or more reinforcing brackets or plates 112n overlying adjacent ends of adjacent sections 110A-110n.

A frame rail section 110n may have a longitudinally-extending web 118 having a first face and a second face. A first or upper flange 120 extends laterally in a first direction from a first or upper edge of the frame rail section 110n and generally perpendicular thereto, and a second or lower flange 122 extends laterally in a second direction from a second or lower edge of the frame rail section 110n and generally perpendicular thereto. As such, the first and second directions may be generally parallel to each other. A first lip 124 may extend in a third direction or downwardly from the first flange 120 and generally perpendicular thereto, and a second lip 126 may extend in a fourth direction or upwardly from the second flange 122 and generally perpendicular thereto. As such, the third and fourth directions may be generally parallel to each other.

Each frame rail section 110n may define a formed or embossed region 114 at one or both ends thereof. One or more apertures 116 configured to receive mechanical fasteners, for example, bolts, huck bolts, rivets, among others, may extend through the formed region 114. Additional apertures 128 may extend through other portions of the frame rail section 110n. Such apertures 128 may be configured to receive mechanical fasteners, for example, bolts, huck bolts, rivets, among others, to secure cross-members 140 or other components to the frame rail section 110n. The formed regions 114 are shown as generally half dog bone-shaped or T-shaped, but could have other shapes. The formed regions 114 may be formed by stamping or in any other suitable manner. The formed regions may be proud of a first or inner surface of the web 118 and recessed from a second or outer surface of the web 118.

A first reinforcing plate 112A includes a web 130 and may include first through fourth flanges 132, 134, 136, 138. The first flange 132 may extend laterally from a first or upper edge of the web 130 and generally perpendicular thereto. The second flange 134 may extend laterally from a second or lower edge of the web 130 and generally perpendicular thereto. The third flange 136 may extend laterally from a third or rear edge of the web 130 and generally perpendicular thereto. The fourth flange 138 may extend laterally from a fourth or front edge of the web 130 and generally perpendicular thereto. As best shown in FIGS. 6 and 8, the first through fourth flanges 132, 134, 136, 138 are not joined to each other, although they could be. The web 130 may define a formed or embossed region 142. One or more apertures 144 configured to receive mechanical fasteners, for example, bolts, huck bolts, rivets, among others, may extend through the formed region 142. As best shown in FIGS. 6, 7 and 9, the formed region 142 is proud of a first or inner surface of the web 130 and recessed from a second or outer surface of the web 130. The formed region 142 is generally dog bone shaped or I-shaped in a manner complementary to the shapes of adjoining formed regions 114 of butted-together frame rail sections 110A-110n.

A second reinforcing plate 112B may be identical to the first reinforcing plate 112A, except, as best shown in FIG. 10, the embossed region 142 of the second reinforcing plate is recessed from a first or inner surface thereof and proud of a second or outer surface thereof.

Frame rails 110 may be assembled by butting together a first frame rail section 110A and a second frame rail section 110B. A first reinforcing plate 112A may be placed against the first or outer surfaces of the adjoining ends of the first and second frame rail sections 110A, 110B, with the first or inner surface of the first reinforcing plate 112A adjacent the outer surfaces of the adjoining ends of the first and second frame rail sections 110A, 110B. In this configuration, the formed region 142 of the first plate 112A nests with the formed regions 114 of the adjoining ends of the first and second frame rail sections 110A, 110B. Also, the outer (or upper) surface of the first flange 132 of the first plate 112A may engage with the lower surface of the upper flanges 120 of the abutting ends of the first and second frame rail sections 110A, 110B.

Similarly, a second reinforcing plate 112B may be placed against the second or inner surfaces of the adjoining ends of the first and second frame rail sections 110A, 110B, with the first or inner surface of the first reinforcing plate 112A adjacent the inner surfaces of the adjoining ends of the first and second frame rail sections 110A, 110B. In this configuration, the formed region 142 of the second plate 112B nests with the formed regions 114 of the adjoining ends of the first and second frame rail sections 110A, 110B. Also, the outer (or lower) surface of the second flange 134 of the second plate 112B may engage with the upper surface of the lower flanges 122 of the abutting ends of the first and second frame rail sections 110A, 110B.

Fasteners may then be inserted through corresponding, coaxially-aligned apertures 116, 144 of the frame rail sections 110A, 110B and first and second plates 112A, 112B and secured to join the first and second frame rail sections 110A, 110B together.

The embodiments disclosed herein are illustrative. The details thereof may be modified without departure from the scope of the appended claims.

The invention claimed is:

1. A trailer frame comprising:
    a first frame rail section having a first end and a second end;
    a second frame rail section having a first end and a second end;
    each of said first and second frame rail sections comprising:
        a web defining a first T-shaped embossment coextensive with said first end of said web;
        a first flange extending from said web in a first direction generally perpendicular to said web;
        a second flange extending from said web in a second direction generally perpendicular to said web, said second direction generally opposite said first direction;
        a third flange extending from said first flange in a third direction generally perpendicular to said first flange; and
        a fourth flange extending from said second flange in a fourth direction generally perpendicular to said second flange, said fourth direction generally opposite said third direction; and
    a first plate comprising:
        a web having first through fourth side edges;
        a first flange extending in a first direction from said first side edge of said web;
        a second flange extending in said first direction from said second side edge of said web;
        a third flange extending in said first direction from said third side edge of said web; and
        a fourth flange extending in a fourth direction from said fourth side edge of said web;
        wherein said web defines an I-shaped embossment having a first T-shaped portion coextensive with a second T-shaped portion, each of said first and second T-shaped portions complementary to said first T-shaped embossments of said first and second frame rail sections;
    wherein said first end of said first frame rail section abuts said first end of said second frame rail section and wherein said first T-shaped portion of said first plate overlies and nests with said first T-shaped embossment of said first frame rail section and said second T-shaped portion of said first plate overlies and nests with said first T-shaped embossment of said second frame rail section; and
    wherein said first T-shaped portion of said first plate and said first T-shaped embossment of said first frame rail section define corresponding, coaxially-aligned first apertures and said second T-shaped portion of said first plate and said first T-shaped embossment of said second frame rail section define corresponding, coaxially-aligned second apertures, said trailer frame further comprising first fasteners extending through corresponding ones of said first apertures and second fasteners extending through corresponding ones of said second apertures.

2. The trailer frame of claim 1 further comprising a second plate comprising:
    a generally rectangular web having first through fourth side edges;
    a first flange extending in a first direction from said first side edge of said web;
    a second flange extending in said first direction from said second side edge of said web;
    a third flange extending in said first direction from said third side edge of said web; and
    a fourth flange extending in a fourth direction from said fourth side edge of said web;
    wherein said web defines an I-shaped embossment having a first T-shaped portion coextensive with a second T-shaped portion, each of said first and second T-shaped portions complementary to said first T-shaped embossments of said first and second frame rail sections;
    wherein said first T-shaped portion of said second plate overlies and nests with said first T-shaped embossment of said first frame rail section and said second T-shaped portion of said second plate overlies and nests with said first T-shaped embossment of said second frame rail section.

3. The trailer frame of claim 2 wherein said first plate is disposed against respective first faces of said webs of said first and second frame rail sections and said second plate is disposed against respective second faces of said webs of said first and second frame rail sections.

4. The trailer frame of claim 1 wherein said web of said second frame rail section defines a second T-shaped embossment coextensive with said second end of said web of said second frame rail section, said trailer frame further comprising a third frame rail section and a second plate, said third frame rail section comprising:
    a web;
    a first flange extending from said web in a first direction generally perpendicular to said web;
    a second flange extending from said web in a second direction generally perpendicular to said web, said second direction generally opposite said first direction;
    a third flange extending from said first flange in a third direction generally perpendicular to said first flange; and
    a fourth flange extending from said second flange in a fourth direction generally perpendicular to said second flange, said fourth direction generally opposite said third direction;
    wherein said web defines a first T-shaped embossment coextensive with said first end of said web;
    said second plate comprising:
    a web having first through fourth side edges;
    a first flange extending in a first direction from said first side edge of said web;
    a second flange extending in said first direction from said second side edge of said web;

a third flange extending in said first direction from said third side edge of said web; and a fourth flange extending in a fourth direction from said fourth side edge of said web;

wherein said web defines an I-shaped embossment having a first T-shaped portion coextensive with a second T-shaped portion, said first T-shaped portion complementary to said first T-shaped embossment of said third frame rail section and said second T-shaped portion complementary to second T-shaped embossment of said second frame rail section;

wherein said first end of said third frame rail section abuts said second end of said second frame rail section and wherein said first T-shaped portion of said second plate overlies and nests with said first T-shaped embossment of said third frame rail section and said second T-shaped portion of said first plate overlies and nests with said second T-shaped embossment of said second frame rail section.

5. The trailer frame of claim 4 further comprising a third plate, said third plate comprising:

a generally rectangular web having first through fourth side edges;

a first flange extending in a first direction from said first side edge of said web;

a second flange extending in said first direction from said second side edge of said web;

a third flange extending in said first direction from said third side edge of said web; and a fourth flange extending in a fourth direction from said fourth side edge of said web;

wherein said web defines an I-shaped embossment having a first T-shaped portion coextensive with a second T-shaped portion, each of said first and second T-shaped portions complementary to said first T-shaped embossments of said first and second frame rail sections;

wherein said first T-shaped portion of said third plate overlies and nests with said first T-shaped embossment of said first frame rail section and said second T-shaped portion of said third plate overlies and nests with said first T-shaped embossment of said second frame rail section.

6. The trailer frame of claim 5 further comprising a fourth plate, said fourth plate comprising:

a generally rectangular web having first through fourth side edges;

a first flange extending in a first direction from said first side edge of said web;

a second flange extending in said first direction from said second side edge of said web;

a third flange extending in said first direction from said third side edge of said web; and a fourth flange extending in a fourth direction from said fourth side edge of said web;

wherein said web defines an I-shaped embossment having a first T-shaped portion coextensive with a second T-shaped portion, each of said first and second T-shaped portions complementary to said first T-shaped embossments of said first and second frame rail sections;

wherein said first T-shaped portion of said fourth plate overlies and nests with said first T-shaped embossment of said third frame rail section and said second T-shaped portion of said fourth plate overlies and nests with said second T-shaped embossment of said second frame rail section.

7. The trailer frame of claim 6 wherein said third plate is disposed against respective first faces of said webs of said second and third frame rail sections and said fourth plate is disposed against respective second faces of said webs of said second and third frame rail sections.

8. The trailer frame of claim 1 wherein said first flange of said first plate abuts said first flange of said first frame rail section and said first flange of said second frame rail section.

9. The trailer frame of claim 8 wherein said second flange of said second plate abuts said second flange of said first frame rail section and said second flange of said second frame rail section.

10. A trailer frame comprising:

a first frame rail section having a first end and a second end;

a second frame rail section having a first end and a second end;

each of said first and second frame rail sections comprising a web defining a first T-shaped embossment coextensive with said first end of said web; and a first plate comprising a web, said web defining an I-shaped embossment having a first T-shaped portion coextensive with a second T-shaped portion, each of said first and second T-shaped portions complementary to said first and second T-shaped embossments of said first and second frame rail sections;

wherein said first end of said first frame rail section abuts said first end of said second frame rail section and wherein said first T-shaped portion of said first plate overlies and nests with said first T-shaped embossment of said first frame rail section and said second T-shaped portion of said first plate overlies and nests with said first T-shaped embossment of said second frame rail section; and wherein said first T-shaped portion of said first plate and said first T-shaped embossment of said first frame rail section define corresponding, coaxially-aligned first apertures and said second T-shaped portion of said first plate and said first T-shaped embossment of said second frame rail section define corresponding, coaxially-aligned second apertures, said trailer frame further comprising first fasteners extending through corresponding ones of said first apertures and second fasteners extending through corresponding ones of said second apertures.

11. The trailer frame of claim 10 further comprising a second plate comprising a web, said web defining an I-shaped embossment having a first T-shaped portion coextensive with a second T-shaped portion, each of said first and second T-shaped portions complementary to said first T-shaped embossments of said first and second frame rail sections;

wherein said first T-shaped portion of said second plate overlies and nests with said first T-shaped embossment of said first frame rail section and said second T-shaped portion of said second plate overlies and nests with said first T-shaped embossment of said second frame rail section.

12. The trailer frame of claim 11 wherein said first plate is disposed against respective first faces of said webs of said first and second frame rail sections and said second plate is disposed against respective second faces of said webs of said first and second frame rail sections.

13. The trailer frame of claim 10 wherein each of said first and second frame rail sections further comprises a first flange extending from said web in a first direction generally perpendicular to said web.

14. The trailer frame of claim 13 wherein a first surface of said first plate is in engagement with said first flange of said first frame rail section and said first flange of said second frame rail section.

15. The trailer frame of claim 14 wherein said first surface of said first plate comprises a side edge of said first plate.

16. The trailer frame of claim 14 wherein said first surface of said first plate comprises a first flange extending from a side edge of said first plate.

17. The trailer frame of claim 12,
   wherein each of said first and second frame rail sections further comprises a first flange extending from said web in a first direction generally perpendicular to said web and a second flange extending from said web in a second direction generally perpendicular to said web, said second direction generally opposite said first direction;
   wherein a first surface of said first plate is in engagement with said first flange of said first frame rail section and said first flange of said second frame rail section; and
   wherein a first surface of said second plate is in engagement with said second flange of said first frame rail section and said second flange of said second frame rail section.

18. The trailer frame of claim 14 wherein said first surface of at least one of said first plate and said second plate comprises a side edge thereof.

19. The trailer frame of claim 14 wherein said first surface of at least one of said first plate and said second plate comprises a first flange extending from a side edge thereof.

* * * * *

UNITED STATES PATENT AND TRADEMARK OFFICE
CERTIFICATE OF CORRECTION

PATENT NO. : 9,776,659 B2  
APPLICATION NO. : 14/930855  
DATED : October 3, 2017  
INVENTOR(S) : Jonathan Frick Page 1 of 1

It is certified that error appears in the above-identified patent and that said Letters Patent is hereby corrected as shown below:

In the Claims

In Column 3, Claim 1, Line 52 should read as follows:
--a fourth flange extending in said first direction from said--

In Column 4, Claim 2, Line 22 should read as follows:
--a fourth flange extending in said first direction from said--

In Column 5, Claim 4, Line 3 should read as follows:
--a fourth flange extending in said first direction from said--

In Column 5, Claim 5, Line 30 should read as follows:
--a fourth flange extending in said first direction from said--

In Column 5, Claim 6, Line 54 should read as follows:
--a fourth flange extending in said first direction from said--

Signed and Sealed this
Fourteenth Day of November, 2017

Joseph Matal
*Performing the Functions and Duties of the*
*Under Secretary of Commerce for Intellectual Property and*
*Director of the United States Patent and Trademark Office*